Oct. 28, 1969    E. J. TASSET    3,474,948
PRESS FOR MAKING HARROW TOOTH ASSEMBLY
Filed Sept. 11, 1967    3 Sheets-Sheet 2

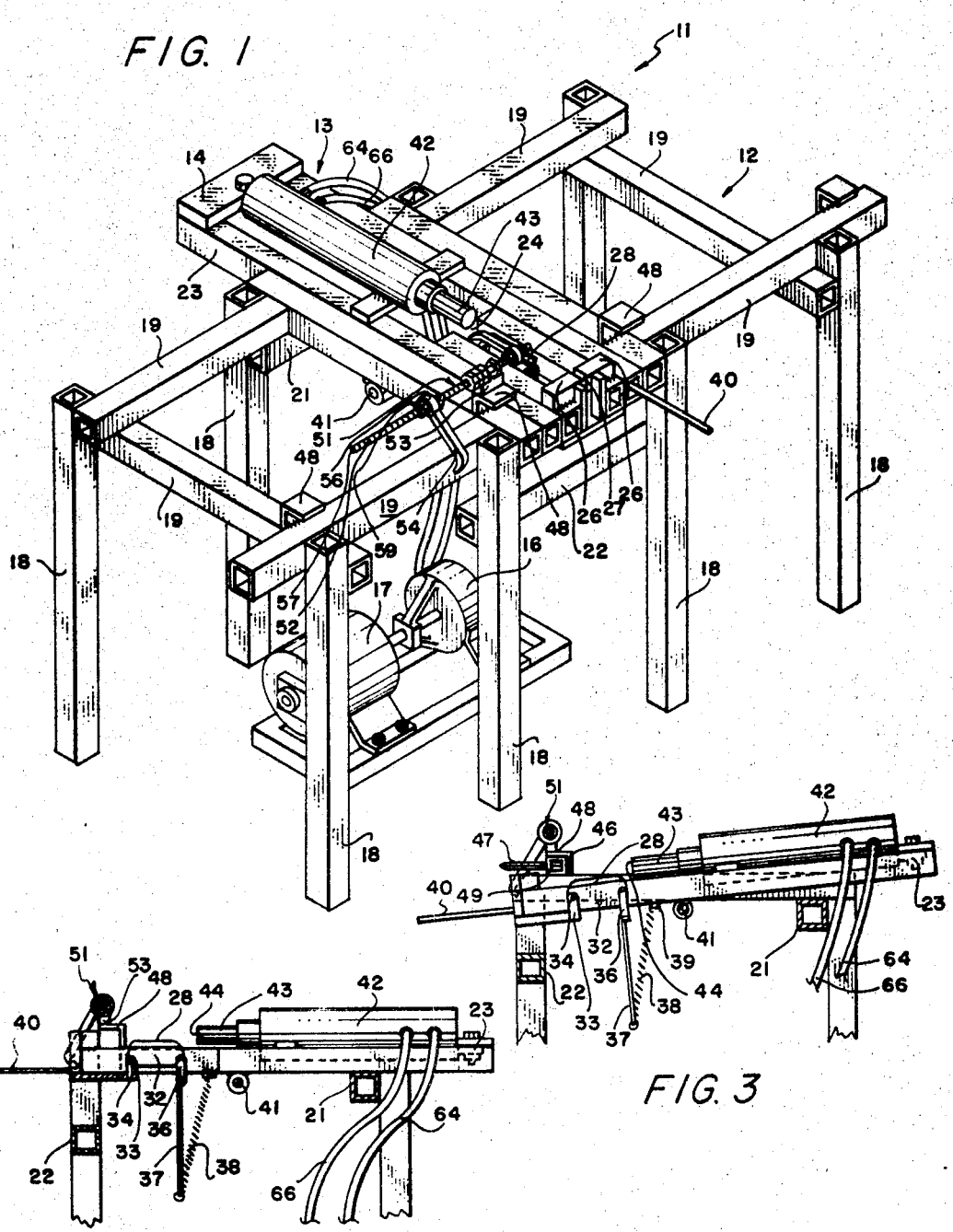

INVENTOR.
EVERETT J. TASSET

BY *John H. Widdowson*
*Glen M. Burdick*
ATTORNEYS

Oct. 28, 1969  E. J. TASSET  3,474,948
PRESS FOR MAKING HARROW TOOTH ASSEMBLY
Filed Sept. 11, 1967  3 Sheets-Sheet 3
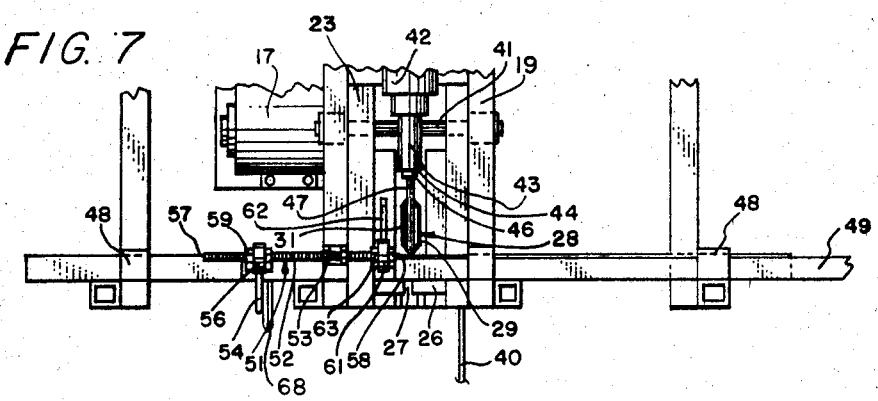
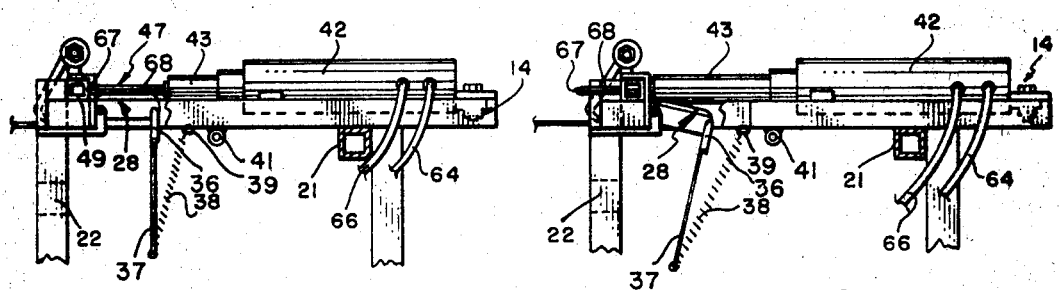
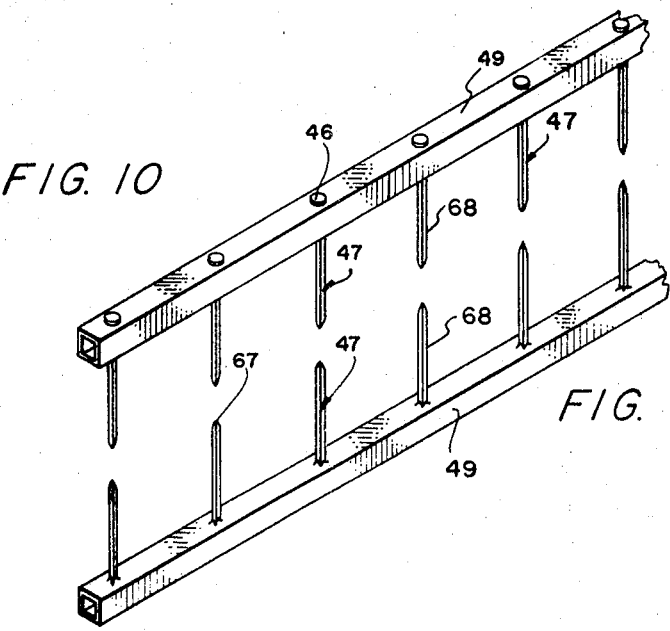
INVENTOR.
EVERETT J. TASSET
BY
ATTORNEYS United States Patent Office 3,474,948
Patented Oct. 28, 1969

3,474,948
PRESS FOR MAKING HARROW TOOTH ASSEMBLY
Everett J. Tasset, Spearville, Kans. 67876
Filed Sept. 11, 1967, Ser. No. 666,879
Int. Cl. B27f 7/02; A01b 19/02
U.S. Cl. 227—150                             11 Claims

ABSTRACT OF THE DISCLOSURE

A machine for producing a harrow tooth assembly by forcing a tooth member into a tubular member wherein the tooth member is maintained in the tubular member solely by friction created as the tooth member is forced therethrough. A pivotable press carriage is provided so that the forward portion of the pivotal press carriage can be displaced in a downward direction a sufficient distance to allow the tooth member to clear the upwardly extending leg members of a stop means thereby allowing the tubular member having the tooth member positioned therein to be slidably advanced to another position thereby allowing another tooth member to be positioned therein. The tooth member is positioned within the tubular member by hydraulic cylinder and piston means mounted to the pivotable press carriage and the hydraulic cylinder and piston means are provided with a piston rod. Upon activation of the hydraulic cylinder and thus the piston means, the piston rod is contacted with a head portion of the tooth member and a pressure of about 20,000 p.s.i. is produced on the head of the tooth member thereby forcing the tooth member through the walls of the tubular member at a rate of about 3 to 6 inches per second.

---

This invention relates to a press. In one aspect it relates to a hydraulic press means. In another aspect it relates to a hydraulic press means having a pivotable press carriage. In another aspect it relates to a press means for forcing a tooth member into a tubular member wherein said tooth member is maintained in said tubular member solely by friction created as the tooth member is forced therethrough without a buckling or crushing effect of the tubular members.

Harrows are known in the art. However, harrows of the prior art suffer from the disadvantage of employing auxiliary connecting means to maintain the teeth members of a harrow in place. Due to these connecting means the teeth in the harrow become loosened upon use thereby causing the teeth to become uneven and produce an undesirable result. Likewise, various pile-type driving means are known. However, most of the driving means of the prior art are operated with a rapid driving impact. When a driving means having a rapid driving impact is employed to force an object, such as a tooth member, through a hollow tubular structure problems have occurred in that the tubular structure is caused to buckle or crush due to the rapid driving impact. The use of an insert within the walls of the hollow tubular structure is not practical in that it is expensive and too time consuming.

I have now found that a press can be constructed wherein a tooth member can be forced to penetrate a tubular member without causing the buckling or crushing of the tubular member and without the necessity of internal supports. Further, I have found that by providing a pivotable press carriage the tubular member having a tooth member positioned therein can be slidably positioned within the apparatus without the need of removing the tubular member from the machine.

An object of my invention is to provide a press assembly for forcing a tooth member into a tubular member.

Another object of my invention is to provide a press assembly which will not crush or buckle the tubular member as the tooth member is forced therethrough.

Another object of my invention is to provide a press assembly for producing a harrow tooth bar without expensive auxiliary equipment and, wherein the tooth members within the bar are maintained in position solely by friction created as the tooth is forced therethrough.

Another object of my invention is to provide a pivotable press carriage so that the tubular member having a tooth member positioned therein can be slidably positioned within the machine without the need to remove the tubular press assembly.

These and other objects and advantages of the present invention will become apparent to one skilled in the art from a study of the drawings, the written description, and the appended claims.

According to the present invention I have now found that a harrow tooth bar can be produced wherein the tooth members are maintained therein solely by friction created as a tooth member is forced to penetrate a tubular member by employing a machine having a pivotable press carriage and a hydraulic press means capable of creating a pressure of about 20,000 p.s.i. on the head portion of said tooth member and thus causing said tooth member to penetrate said tubular member at a rate of about 3 to 6 inches per second.

Further according to my invention I have found that by employing the press apparatus of the present invention that the tooth member can be positioned within the tubular member without a crushing or buckling effect of the tubular member, and, without the need of support elements positioned within said tubular member.

Further according to the invention, I have found that by employing a pivotable press carriage in said press means that the forward portion of the pivotable press carriage can be displaced in a downward direction a sufficient distance to allow the tooth member positioned within said tubular member to clear the apparatus and thus allow the tubular member having the tooth member positioned therein to be slidably advanced to another position to allow another tooth member to be positioned therein.

In the drawings,

FIG. 1 is a perspective view of a press assembly according to the invention;

FIG. 2 is a cross sectional view of the apparatus of FIG. 1 showing the press carriage and the press means;

FIG. 3 is a cross sectional side view of the press carriage and press means wherein the press carriage has been pivoted in a downwardly direction;

FIG. 7 is a partially broken view of FIG. 5 showing the tooth member positioned prior to penetration of the tubular member;

FIG. 8 is a cross sectional view of the pivotable press carriage and press means taken along line 2—2 of FIG. 4;

FIG. 9 is a cross sectional view of the pivotable press carriage and press means of FIG. 4 taken along line 2—2 of FIG. 4 wherein the guide means has been displaced by tooth member and press means passing thereover;

FIG. 10 is a schematic illustration of the harrow tooth bar produced according to the invention; and FIG. 11 is a schematic illustration of the bar of FIG. 10 showing the lower surface of the bar having the tooth members positioned therein and maintained therein solely by friction created as said tooth member is forced through said tubular conduit by said press means.

Figure 4:
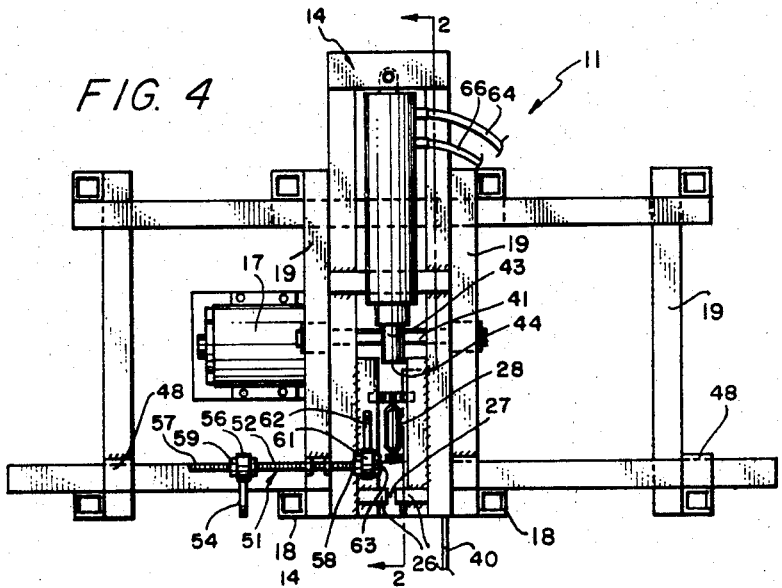
FIG. 4 is a top elevational view of the apparatus of FIG. 1.

Referring now to the drawings, wherein like elements will be designated by like numerals, and particularly to FIG. 1, a press machine for making a harrow tooth assembly is generally designated by numeral 11. Machine 11 comprises a frame 12, a press means 13 pivotably mounted on frame 12, and hydraulic pump 16 operatively connected to motor 17 and press means 13 so as to cause press means 13 to operate in response thereto. Press means 13 is provided with a hydraulic cylinder and piston means 42 and a press carriage means 14.

Frame 12 is provided with a plurality of spaced upright members 18 and support members 19. A first transverse support element 21 is positioned adjacent and below the rear portion of press carriage means 14 and is connected to two of spaced upright members 18 and four of support members 19 by any suitable means such as welding, bolting, and the like. First transverse support element 21 serves both as a support for press means 13, as well as a connecting member for two spaced upright members 18. A second transverse support element 22 is positioned so as to connect upright members 18 at the forward portion of press carriage means 14. Second transverse support element 22 is positioned parallel to first transverse support element 21, but, at a lower elevation as can readily be seen in FIGS. 1, 2 and 3. Second transverse support element 22 serves not only as a connecting member for two of the spaced upright members 18, but also as a stop when the forward portion of press carriage means 14 is caused to be displaced in a downward direction.

Press carriage means 14 is provided with base member 23 having an opening 24 positioned in the forward portion of base member 23. A stop means, such as a plurality of upwardly extending leg members 26, is connected to the forward upper surface of base member 23 in a spaced parallel relationship with each other to provide opening 27 therebetween. Upwardly extending leg members 26 are positioned so that opening 24 of base member 23 and opening 27 produced by leg members 26 are aligned.

A guiding means 28 is positioned within opening 24 of base member 23. Referring now, in part, to FIG. 7, in conjunction with FIGS. 2 and 3, guiding means 28 is provided with two tray elements 29 and 31 which are joined to form a V-shaped tray. A vertical support member 32 is connected to the bottom of V-shaped tray. Vertical support member 32 is pivotably connected to plate 33 by pin 34 at its forward end. Plate 33 is then connected to the lower forward portion of base member 23 by any suitable means such as welding, bolting, and the like. A stationary plate member 36 is connected to the rear portion of vertical support member 32 by welding, and the like. An extension member, such as rod 37, is connected to stationary plate member 36 at one end and to a resilient element, such as spring 38, at the other end. The other end of spring 38 is then connected to the lower surface of base member 23 at a point to the rear of opening 24 in base member 23 by any suitable means, such as eyelet 39, which in turn, is connected to base member 23 by welding and the like.

A pivot means, such as shaft 41, is connected to two of support members 19 in such a manner so as to transversely extend and be adjacent the lower portion of base member 23 at a point where the forward portion of base member 23 can be caused to be extended downward when a downward pressure is applied to the forward portion of base member 23. Shaft 41 is connected to support members 19 by any suitable means such as welding.

A lever means, such as rod 40, is connected to the forward portion of base member 23 so that a downwardly directed pressure can be applied thereon and thus cause base member 23 to be pivoted on shaft 41 thereby causing the front portion of base member 23 to be lowered until contacting second transverse support element 22.

A press means, such as hydraulic cylinder and piston means 42 is mounted on the upper surface of base member 23 by welding, bolting, and the like. Hydraulic cylinder and piston means 42 is provided with piston rod 43. End portion 44 of piston rod 43 is adapted to contact head 46 of tooth member 47. Hydraulic cylinder and piston means 42, and thus piston rod 43, are positioned on base member 23 so as to align piston rod 43 with guiding means 28, formed by tray elements 29 and 31, and opening 27 formed by upwardly extending leg members 26.

A plurality of support elements 48 are connected to the upward surface of forward support members 19 by any simple means such as welding, bolting, and the like. Support elements 48 are positioned in a plane parallel to leg members 26 and in a spaced relationship so as to form a guide means for a tubular member, such as square shaped tubular member 49, but, at the same time, allowing the tubular member to be readily moved within the guide means so formed in a plane perpendicular to base member 23 and thus hydraulic cylinder and piston means 42.

An adjustable positioning means 51 is connected to a support element 48, such as support element 48 adjacent leg members 26 on the side opposite the direction of the feeding motion of the tubular member. Adjustable positioning means 51 is provided with a threaded member 52, attached to the plate element 53 which is then connected to support element 48 by any suitable means, such as welding. Threaded member 52 is connected to plate element 53 in a manner so that ends of 57 and 58 of threaded member 52 extend beyond plate element 53. A first collar means 56 is attached to one end of first shank element 54 by any suitable means, such as welding, and first collar means 56 is provided with an opening so that end portion 57 of threaded member 52 can be positioned therein. First collar means 56 is designed so that threaded member 52 fits snugly therein but, at the same time, can be moved in an up and down manner. First collar means 56 and thus first shank element 54 are maintained on threaded member 52 by any suitable means, such as lock nut 59. A second collar 61 is attached to one end of a second shank element 62 by any suitable means, such as welding, and second collar means 61 is provided with an opening so that end portion 58 of threaded member 52 can be positioned therein. Second collar means 61 is designed so that threaded member 52 fits snugly therein but, at the same time, can be moved in an up and down manner. Second collar means 61 and thus second shank element 62 are maintained on threaded member 52 by any suitable means, such as lock nuts 63.

Referring now to FIGS. 4–9, the operation of machine 11 will be described with reference to the drawings. First collar 56 and thus first shank element 54 are positioned upon end portion 57 of threaded member 52 of adjustable tooth positioning means 51 at a pre-determined position and then secured in place by lock nuts 59. The positioning of adjustable tooth positioning means 51 is determined by determining the desired distance between the tooth members in the tubular member. Second collar means 61 and thus second shank element 62 are positioned upon end portion 58 of threaded member 52 of adjustable tooth positioning means 51 at a pre-determined position and then secured in place by lock nuts 63. Second shank element 62 of adjustable tooth positioning means 51 is provided to act as a stop as square shaped tubular steel member 49 is positioned between support element 48 and leg members 26. As can readily be seen by FIG. 4, second shank 62 and collar 61 of positioning means 51 is connected to end portion 58 of threaded member 52 so as to always allow a portion of square shaped tubular member 49 to cover opening 27 produced by leg members 26.

Figure 5:
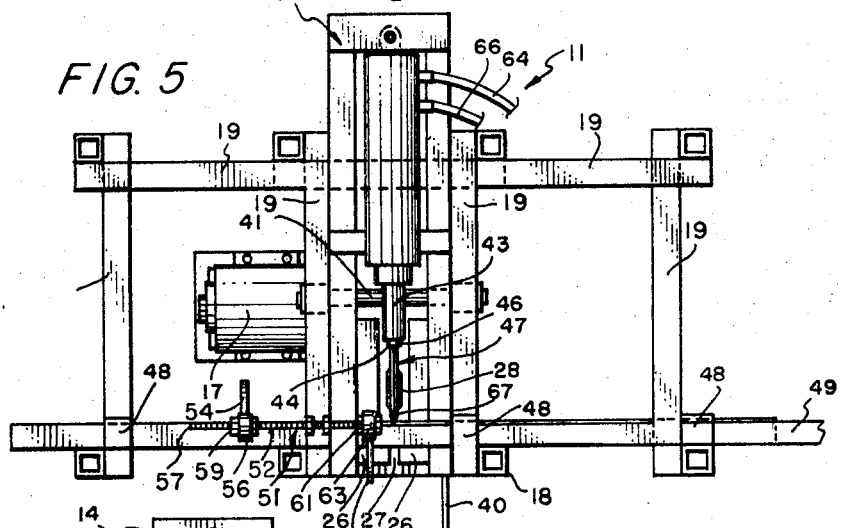
FIG. 5 is a top elevational view of the apparatus of FIG. 1 wherein a tooth member is positioned prior to activating the press means.
Figure 6:
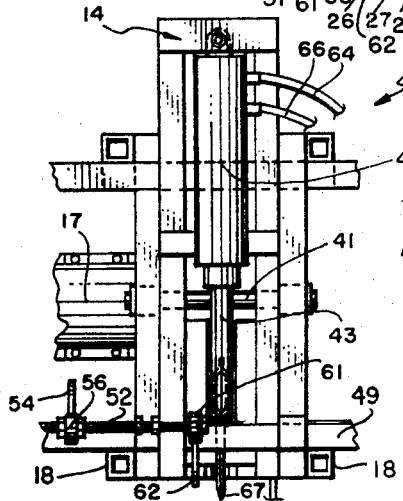
FIG. 6 is a partially broken top view of FIG. 5 wherein the press means has been activated thereby causing the tooth member to penetrate the tubular member.

Tooth member 47 is then positioned wtihin guide means 28 and head 46 of tooth member 47 is positioned adjacent end 44 of piston rod 43. A fluid is then introduced to hydraulic cylinder and piston means 42 via one of hoses 64 or 66 produced by a combination of motor 17 and hydraulic pump 16 thereby causing piston rod 43 and thus tooth member 47 is to be moved in a forward direction. As can be seen in FIGS. 5 and 8, semi-pointed tip 67 of tooth member 47 is caused to contact one side of square shaped tubular steel member 49 and to penetrate square shaped tubular steel member 49 by pressure exerted on tooth member 47 by piston rod 43. After the penetration of square shaped tubular steel member 49 by tooth member 47 has commenced piston rod 43 is caused to contact guide means 28 and cause guide means 28 to be depressed thereby placing tension on spring 38. After the forward stroke of piston rod 43 is completed and tooth member 47 is positioned within square shaped tubular steel member 49 piston rod 43 is caused to reciprocate and, upon withdrawing over guide means 28, spring 38 causes guide means 28 to return to its original position.

Once tooth member 47 is positioned within square shaped tubular steel member 49 and piston rod 43 is reciprocated second collar means 61 and thus second shank 62 are positioned so as to be in an upward position and first collar means 56 and thus first shank 54 are positioned in a downward position (see FIG. 7). A downward force is then exerted on rod 40 thereby causing press carriage means 14 to be pivoted upon shaft 41 in a downwardly direction until the downward direction is stopped by second transverse support 22. Upon lowering the forward portion of press carriage means 14, upwardly extending leg members 26 are also lowered thereby allowing tooth member 47 positioned within square shaped tubular steel member 49 to clear the upper surface of upwardly extending leg members 26.

Square shaped tubular steel member 49 having tooth member 47 positioned therein can be slidably moved along forward support member 19 until shank 68 of tooth member 47 becomes adjacent first shank element 54 of adjustable tooth positioning means 51. The downward pressure on shaft 41 is then released causing press carriage means 14 to return to a horizontal position. Another tooth member 47 is then positioned within guiding means 28 and hydraulic cylinder and piston means 42 is activated thereby causing piston rod 43 to move forward in the manner hereinbefore described. Upon completion of the penetration of square shaped tubular steel member 49 by a second tooth member first shank element 54 of adjustable tooth positioning means 51 is rotated in an upward direction thereby allowing tooth member 47 to be clear of first shank element 54.

Press carriage means 14 is then again lowered by pressure upon rod 40. Square shaped tubular steel member 49 is again slidably moved along forward support member 19, until the tooth member has cleared upwardly extending leg members 26. First shank member 54 of adjustable tooth positioning means 51 is then again caused to be rotated so as to project first shank element 54 in a downwardly direction and then square shaped tubular steel member 49 is slidably moved until the second tooth member positioned within square shaped tubular steel member 49 becomes adjacent first shank element 54.

The process is then repeated step by step until the desired number of tooth members are positioned within the tubular steel member.

Referring now to FIGS. 10 and 11, the product produced by the apparatus described in FIGS. 1 through 9 is shown. FIG. 10 shows square shaped tubular steel member 49 having a plurality of tooth members 47 positioned therein wherein head 46 of tooth members 47 are flush with the upper surface of square shaped tubular steel member 49. As can clearly be seen in FIG. 11 the penetration force of tooth member 47 through square shaped tubular steel member 49 causes the tooth members to be maintained therein solely by friction and forces between semi-pointed tip 67 and shank 68 of tooth members 47 and square shaped tubular steel member 49 created as tooth member 47 is forced therethrough. Especially desirable results have been obtained wherein tooth member 47 is preformed of C–1045 type steel having a pressure rating in the range of about 100,000–200,000 p.s.i. and semi-pointed tip 67 is heat treated. Square shaped tubular steel member 49 is preferably a cold rolled steel having a pressure rating in the range of about 30,000 to 50,000 p.s.i. and a wall thickness of $\frac{1}{8}''$ to $\frac{3}{16}''$. Tooth member 47 is forced through the sidewalls of square shaped tubular steel member 49 at a rate of about 3 to 6 inches per second by providing a pressure of about 20,000 p.s.i. on head 46 of tooth member 47 by hydraulic cylinder and piston means 42. We have found that by employing the apparatus of the above invention that the tooth members can be positioned within the square shaped tubular steel member without buckling or collapsing of the member due to the penetration of the tooth member.

While the above apparatus has been described employing a hydraulic system as the press means it is to be understood that other suitable systems, such a pneumatic system, are within the scope of the present invention and the hydraulic system has been employed in the written specification only for simplicity sake.

The foregoing discussion and description have been made in connection with preferred specific embodiments of a press for making harrow tooth assemblies of the invention. However, it is to be understood that the discussion and description is only intended to illustrate and teach those skilled in the art how to practice the invention, and such is not to unduly limit the scope of the invention, which is defined in the claims set forth hereinafter.

I claim:

1. A machine for producing a tooth member within a tubular member solely by friction and forces between said tooth and tubular member created as said tooth member is forced through said tubular member comprising:
    (a) a frame;
    (b) a press means pivotally mounted on said frame;
    (c) a stop means carried by said pivotally mounted press means, said stop means of defining an opening within said stop means so as to allow a portion of a tooth member to pass therethrough in response to operation of said press means; and
    (d) a manually actuated means connected to said pivotally mounted press means so as to cause upon operation the forward portion of said pivotally mounted press means to be displaced in a downward direction a sufficient distance to allow said tooth member to clear said stop means thereby allowing said tubular member having said tooth member therein to be slidably advanced to allow another tooth member to be positioned therein by said press means.

2. The machine according to claim 1 to include a tooth member guide means pivotally mounted in an opening in the forward portion of said press means, said guide means being aligned with the opening defined by said stop means.

3. The machine according to claim 2, wherein said stop means is connected to the forward portion of said pivotally mounted press means, said stop means having a plurality of upwardly extending leg members maintained in a parallel spaced relationship with each other and thus defining an opening therein.

4. The machine according to claim 2 to include a resilient element attached to said guide means and said press means to yieldingly maintain said guide means aligned with the opening defined by said stop means.

5. The machine according to claim 4, wherein said guide means comprises two tray elements and a vertical support member, said tray elements being positioned so as to form a V and said vertical support member being pivotally mounted to said press means.

6. The machine according to claim 1 wherein, said press means comprises a press carriage; a hydraulically actuated cylinder and piston means mounted on said press carriage, said cylinder and piston means having a piston rod, said rod having its end furtherest removed from said piston means adapted to contact the head of said tooth member; whereby actuation of said cylinder and piston means causes said piston rod and thus said tooth member to move in a forward direction.

7. The machine according to claim 6 to include a shaft connected to said frame and positioned transverse and adjacent the lower surface of said press carriage, said shaft functioning as a pivot for said press carriage and thus said hydraulic cylinder and piston means.

8. The machine according to claim 1 to include a plurality of support elements mounted to said frame in a spaced relationship with said stop means thereby maintaining said tubular member in a stable, slidable position.

9. The machine according to claim 1 to include an adjustable, pivotable stop means positioned and connected to said frame so as to contact said tooth member previously positioned within said tubular member thereby providing a means for producing evenly spaced tooth members in said tubular member.

10. The machine according to claim 9 wherein said adjustable, pivotable stop means comprises, a first collar means attached to one end of a first shank element, said first collar means having an opening therein, a second collar means attached to one end of a second shank element, said second collar means having an opening therein, and a threaded member having one end extending through the opening of said first collar means and connected thereto by locking means and having its other end extending through the opening of said second collar means and connected thereby by a second locking means.

11. The machine for producing a harrow tooth bar having a plurality of tooth members positioned within a square shaped, tubular steel member according to claim 1, wherein said tooth members are maintained in said square shaped, tubular steel member solely by friction created as said tooth members are forced therethrough comprising:
(a) a frame,
(b) a pivotable press carriage carried by said frame;
(c) a shaft member connected to said frame and positioned transverse and adjacent the lower surface of said press carriage, said shaft member functioning as a pivot means for said press carriage;
(d) a tooth member guide means comprising two tray elements and a vertical support member, said tray element being positioned so as to form a V and said vertical support member being connected to the forward portion of said pivotable press carriage,
(e) a spring element attached to said vertical support member of said guide means and said press carriage,
(f) a stop element having a pair of upwardly extending leg members defining a vertical slot therein so as to allow a portion of one of said teeth members to pass therethrough; said vertical slot being aligned with said guide means,
(g) a plurality of support elements mounted to said frame in a spaced relationship with said stop element thereby maintaining said tubular steel member in a stable slidable positioned between said support element and said stop element;
(h) a hydraulically actuated cylinder and piston means mounted to the upper surface of said press carriage, said cylinder and piston means having a piston rod, said rod having its rod furtherest removed from said piston means adapted to contact a head portion of one of said teeth member; said piston rod being aligned with said guide means and the vertical slot of said stop element, whereby actuation of said cylinder and piston means causes said rod and thus said tooth member to move in a forward direction;
(i) an adjustable, pivotable stop member mounted in said frame and positioned at a point removed from said stop element, said adjustable, pivotable stop member comprising a first collar element attached to one end of a first shank element, said first collar element having an opening therethrough, a second collar element attached to one end of a second shank element, said second collar element having an opening therethrough, and a threaded member having one end extending through the opening of said first collar means and connected thereto by lock nuts and having its other end extending through the opening of said second collar means and connected thereto by lock nuts; and
(j) a manually actuated lever rod mounted to the forward portion of said press carriage so as to cause the forward portion of said press carriage to be pivoted downwardly at said shaft member when a downward force is applied thereto for a sufficient distance to allow said tooth member to clear the upwardly extending leg members of said stop means thereby allowing said tubular steel member having said tooth member therein to be slidably advanced to allow another tooth member to be positioned therein.

References Cited
UNITED STATES PATENTS

| | | | |
|---|---|---|---|
| 155,284 | 9/1874 | Blaser | 27—150 |
| 1,344,441 | 6/1920 | Christensen | 227—150 |
| 3,325,879 | 6/1967 | Morkowski | 29—148.3 |

GRANVILLE Y. CUSTER, JR., Primary Examiner